US012619447B2

(12) United States Patent
Chalkley et al.

(10) Patent No.: US 12,619,447 B2
(45) Date of Patent: May 5, 2026

(54) MESSAGE PERSONALIZATION FOR AN ELECTROMECHANICAL DEVICE

(71) Applicant: eBay Inc., San Jose, CA (US)

(72) Inventors: Andrew Chalkley, Milwaukie, OR (US); Paul Telis Stathacopoulos, San Carlos, CA (US)

(73) Assignee: eBay Inc., San Jose, CA (US)

( * ) Notice: Subject to any disclaimer, the term of this patent is extended or adjusted under 35 U.S.C. 154(b) by 119 days.

(21) Appl. No.: 18/538,760

(22) Filed: Dec. 13, 2023

(65) Prior Publication Data

US 2025/0199818 A1     Jun. 19, 2025

(51) Int. Cl.
*G06F 9/445* (2018.01)
*G06F 9/451* (2018.01)

(52) U.S. Cl.
CPC .......... *G06F 9/44505* (2013.01); *G06F 9/451* (2018.02)

(58) Field of Classification Search
CPC ............................ G06F 9/44505; G06F 9/451
See application file for complete search history.

(56) References Cited

U.S. PATENT DOCUMENTS

| | | | |
|---|---|---|---|
| 9,472,028 B2 | 10/2016 | Abdel-Rahman et al. | |
| 10,423,982 B2 | 9/2019 | Wasserman et al. | |
| 10,867,338 B2 * | 12/2020 | Price .................. | G06F 16/9538 |
| 11,017,351 B2 | 5/2021 | Sethi et al. | |

| | | | | |
|---|---|---|---|---|
| 2014/0163949 A1 * | 6/2014 | Nazarian | ............ | H04N 21/2358 |
| | | | | 704/2 |
| 2019/0019356 A1 | 1/2019 | Liu et al. | | |
| 2019/0130671 A1 * | 5/2019 | Dillow | .................. | G06V 20/20 |
| 2019/0251759 A1 | 8/2019 | Lora et al. | | |
| 2020/0050856 A1 * | 2/2020 | Chikkaveerappa | .... | G06V 20/20 |
| 2021/0232642 A1 * | 7/2021 | Ricci | .................. | B60R 25/1004 |
| 2021/0258752 A1 | 8/2021 | Burkin, Jr. et al. | | |
| 2023/0186756 A1 * | 6/2023 | Kulkarni | .............. | G08B 25/009 |
| | | | | 340/506 |
| 2023/0259821 A1 | 8/2023 | Travalini et al. | | |
| 2023/0386273 A1 * | 11/2023 | Kamma | .............. | B60W 50/032 |
| 2024/0257096 A1 * | 8/2024 | Doumar | ............. | G06Q 20/3276 |
| 2024/0289362 A1 * | 8/2024 | Williams | .............. | G06Q 50/01 |
| 2025/0013417 A1 * | 1/2025 | Dehkordi | ............... | G06F 9/451 |

(Continued)

OTHER PUBLICATIONS

Hyundai , "Hyundai Auto Link: User Guide", Hyundai Automaker, May 19, 2017, 36 pages.

(Continued)

*Primary Examiner* — Nimesh G Patel
(74) *Attorney, Agent, or Firm* — FIG. 1 Patents

(57) ABSTRACT

Message personalization for an electromechanical device is described. Data is received, the system information data associated with a change in state of one or more components of an electromechanical device. A message is generated by inputting the system information data as a prompt to generative artificial intelligence representative of one or more characteristics of the electromechanical device and trained to analyze the system information data. The message indicates feedback responsive to the change in state of the one or more components. The message is output, where one or more language characteristics of the message are associated with the one or more characteristics of the electromechanical device.

20 Claims, 8 Drawing Sheets

(56) References Cited

U.S. PATENT DOCUMENTS

2025/0046883 A1 *  2/2025  Uemura  ...............  H01M 10/48

OTHER PUBLICATIONS

Toyota, "Toyota App", Toyota Motor Sales, U.S.A., Inc. Retrieved Aug. 30, 2023, 10 pages.
Vector , "Diagnostics from a Distance: Interactive Diagnostics for Vehicles Worldwide", Vector Informatik GmbH, Sep. 14, 2016, 4 pages.

* cited by examiner

Personalized Messaging System 104

102

600

700

Audio Prompt 714

Car, please take me to destination A.

712

102

Personalized Messaging System 104

Network(s) 108

Feedback 126

Good day sir. I'll get us on our way now. By the way, I've updated the system settings for you.

716

710

100 140
60
180
20
220
Km/h 260

2  3
1  4
1/min*1000  5

702

706

704

708

800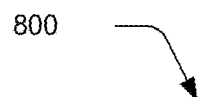

---

802
Receive system information data associated with a change in state of one or more components of an electromechanical device

---

804
Generate a message indicating feedback responsive to the change in state of the one or more components, the generating performed by inputting the system information data as a prompt to generative artificial intelligence representative of one or more characteristics of the electromechanical device, the generative artificial intelligence trained to analyze the system information data, where one or more language characteristics of the message associated with the one or more characteristics of the electromechanical device

---

806
Output the message indicating the feedback

MESSAGE PERSONALIZATION FOR AN ELECTROMECHANICAL DEVICE

BACKGROUND

Conventional techniques used to perform maintenance on an electromechanical device (e.g., an automobile or vehicle) typically include running diagnostics on one or more components of the electromechanical device. In one or more implementations, a diagnostics tool or system may be utilized to access and interpret diagnostics information. The diagnostics tool or system may be an on-board diagnostics (OBD) tool communicatively coupled with and/or integrated with a system of the electromechanical device. For example, the electromechanical device may include a port that couples the system of the electromechanical device with the diagnostics tool or system. The diagnostics tool or system may provide real-time data and/or diagnostics codes to identify issues with the electromechanical device and/or to determine a recommended maintenance procedure for the electromechanical device.

A computer system may implement machine learning techniques, or artificial intelligence, to generate an output given a prompt as input. For example, a computer system may utilize a generative artificial intelligence model to generate content, data, or outputs that were not explicitly programmed or provided to the generative artificial intelligence model in training data. The generative artificial intelligence model is trained utilizing deep learning techniques (e.g., neural networks) to detect patterns and structures within the training data. In some examples, the generative artificial intelligence model may include one or more large language models for generating text in response to prompts or queries. A large language model may capture patterns and relationships in language, enabling the model to understand context, generate coherent text, and perform various natural language processing tasks.

SUMMARY

A personalized messaging system detects, analyzes, and presents information to a user of an electromechanical device. In one or more implementations, the personalized messaging system implements generative artificial intelligence (e.g., one or more large language models) to generate messages for presentation to a user. For example, the personalized messaging system obtains training data, including characteristics of the electromechanical device, environmental information of an environment of the electromechanical device, and/or electromechanical device data (e.g., maintenance and repair information). The personalized messaging system utilizes the training data to update large language models to generate messages that are representative of the characteristics of the electromechanical device and to train the large language models to analyze data collected from the electromechanical device. The personalized messaging system generates the messages by inputting data that indicates a change in state of a component of an electromechanical device (e.g., an automobile or vehicle) as a prompt to the large language models. The large language models output messages that include feedback responsive to the change in state of the components. For example, the messages include one or more of instructions for repair or maintenance of the component, an indication that one or more system settings of the components are updated, or the like. The messages have language characteristics representative of the characteristics of the electromechanical device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 1 is an illustration of an environment in an example implementation that is operable to employ techniques described herein.

FIG. 8 depicts a procedure in an example implementation of message personalization for an electromechanical device.

DETAILED DESCRIPTION

Overview

Figure 2:
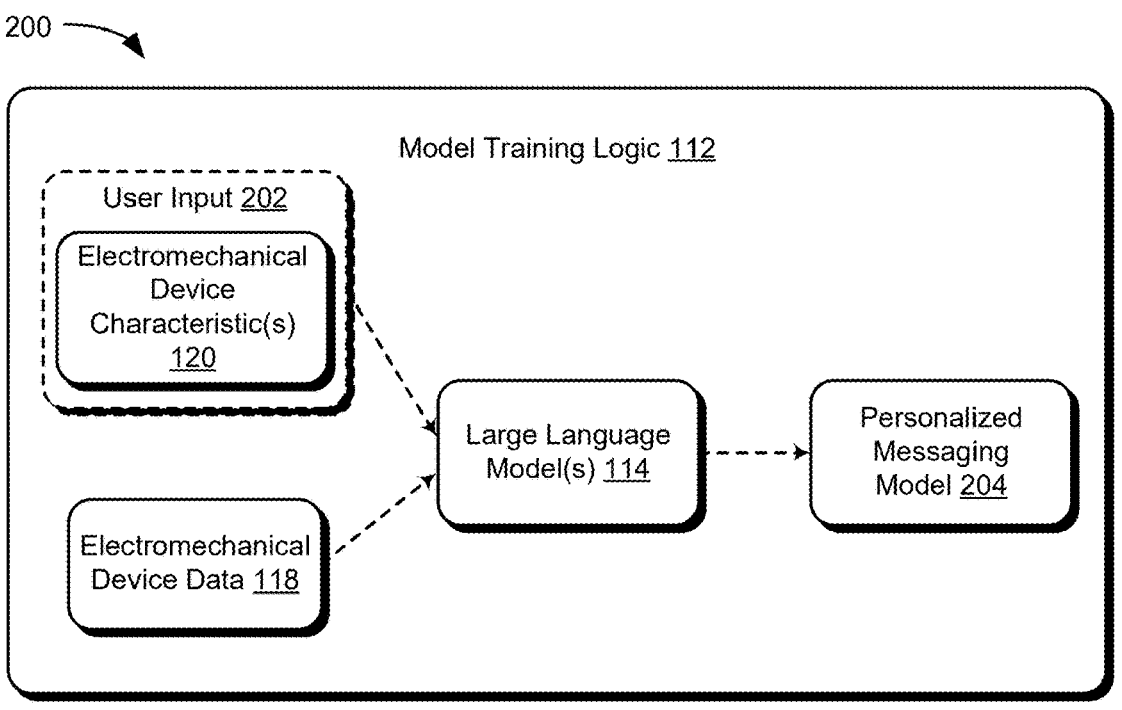
FIG. 2 depicts an example of model training logic for message personalization for an electromechanical device.

Message personalization techniques for an electromechanical device are described. In accordance with the described techniques, a personalized messaging system uses generative artificial intelligence (e.g., one or more large language models) to generate a message with language characteristics unique to an electromechanical device and/or a user of the electromechanical device. The message, in one or more examples, includes feedback indicating a recommendation for maintaining and/or replacing of one or more components of an electromechanical device. In one or more other examples, the message includes an indication that system settings or components have been modified or updated.

In some cases, the language characteristics of the message are personalized for the electromechanical device and/or the user in real time using characteristics of the electromechanical device. Examples of characteristics include a type of the electromechanical device, purchase history data for components of the electromechanical device, physical appearances of the electromechanical device, a date of manufacture of the electromechanical device, system capabilities of the electromechanical device, or the like.

In one or more implementations, the personalized messaging system triggers generation of the message upon detecting a change in one or more components of the electromechanical device. That is, one or more sensors and/or a diagnostics tool integrated with the electromechanical device provide data (e.g., system information data) indicating a variety of scenarios. Examples of these scenarios include indication of a mechanical failure or malfunction of one or more components of the electromechanical device, a software error at the electromechanical device, an error code indicating a maintenance or repair procedure for one or more components of the electromechanical device, a change in presence or absence of a user, or any other change in components. Upon detection of the data, the personalized messaging system triggers generation of a personalized message. For example, the system information data is input as a prompt to one or more large language models configured to generate the personalized message utilizing the prompt. The one or more large language models may be referred to as a personalized messaging model. The personalized message is received as an output from the personalized messaging model.

In some examples, one or more components of an electromechanical device experience failures, including mechanical and software failures or malfunctions. Components that have experienced a malfunction or failure can be repaired or replaced. Additionally, or alternatively, components of an electromechanical device can be maintained to reduce or prevent premature failure and/or to improve operational efficiency of the components. If the electromechanical device is a vehicle, as an example, maintenance including replacement of an air filter component may improve air to fuel ratios and combustion efficiency, replacement of a fuel filter may improve fuel delivery and combustion efficiency, maintaining a defined value for tire pressure reduces rolling resistance and improves fuel efficiency, among other maintenance procedures causing improved operational efficiency.

An agent (e.g., human, or non-human agent) responsible for maintaining or repairing the electromechanical device may utilize sensor data collected from one or more sensors at the electromechanical device to determine a maintenance and/or repair procedure for components of the electromechanical device. Additionally, or alternatively, the agent may utilize a diagnostics tool to obtain a diagnostic code that indicates a repair and/or maintenance procedure for components of the electromechanical device. The agent may then cross reference the diagnostic codes with additional vehicle information and/or manuals including information for maintaining the vehicle, among other information, to select a maintenance procedure for the vehicle. In some examples, the maintenance procedure is a procedure to prevent component failure and/or a procedure to repair a component that has failed.

However, the sensor data and/or the diagnostic code may be difficult to interpret by an agent and/or a user of the electromechanical device. Further, the electromechanical device may be unable to provide additional system information data to the agent and/or the user of the electromechanical device. Displaying information that is difficult to interpret and/or failing to provide additional system information data can lead to further damage of the components of the electromechanical device, such as due to an agent responsible for maintenance or repair of the electromechanical device or a user of the electromechanical device failing performing a correct repair or maintenance on a component. Additionally, or alternatively, displaying information that is difficult to interpret and/or failing to provide additional system information data can lead to increased usage of computational resources (e.g., processing and memory) due to increased search queries to obtain information related to the indication, among other disadvantages.

In one or more implementations, different users may operate, or otherwise interact with, an electromechanical device, where each user may have a preferred set of system settings for a system of the electromechanical device. For example, users may have preferences for seat position, temperature and other climate settings, display configuration settings, and the like. However, the system may be unable to detect and/or process data related to which user is operating the electromechanical device, resulting in additional wear to the components due to manual adjustment of the system settings, as well as increased processing power due to initializing the system using different settings than preferred by the user (e.g., initializing a display, positioning, and climate configuration and then updating the configurations as a user inputs preferences causes inefficient use of computer processing resources).

Thus, to solve the problems associated with maintenance, failure, and/or manual configuration adjustment of components of an electromechanical device, the message personalization techniques use artificial intelligence (e.g., one or more large language models implemented using a neural network) to generate messages with language characteristics unique to the electromechanical device and/or a user of the electromechanical device. The messages include feedback, such as recommendations for component maintenance or recommendations for component repair. Additionally, or alternatively, the message indicates that system settings are updated for a user of the electromechanical device.

In accordance with the described techniques, a personalized messaging system receives system information data indicating a change in state of one or more components of an electromechanical device. The system information data includes sensor data and/or diagnostic codes indicating the change in state of the components. For example, the sensor data or diagnostic codes include an indication that a fluid level is low for a safe operating state of a component, an indication that a component has entered a malfunctioning or failure state, an indication that a wear state of a component has exceeded a recommended or threshold value, or a diagnostic code that maps to a component failure and/or maintenance procedure in a manual or other repository for maintenance and repair of the electromechanical device. In some cases, the system information data includes sensor data indicating an identity of a user of the electromechanical device, such as a weight that matches a known weight of the user, audio data from speech of the user that may be analyzed using voice recognition techniques to identify the identity of the user, image data of the user that may be analyzed using facial image recognition techniques to identify characteristics of the user, or the like.

The personalized messaging system generates a message that includes language characteristics that are personalized for the electromechanical device and/or for the user of the electromechanical device using characteristics of the electromechanical device. In some examples, the language characteristics may be personalized for the user of the electromechanical device at least because the user may specify one or more characteristics of the electromechanical device, a preference for one or more language characteristics, or both. The personalized messaging system trains one or more large language models, which may be referred to as a personalized messaging model, on maintenance and repair data for the electromechanical device, as well as the characteristics of the electromechanical device. The personalized messaging system inputs the system information data as a prompt to the personalized messaging model. The personalized messaging model outputs a message that indicates feedback responsive to the change in state of components of the electromechanical device. For example, the message indicates a recommended maintenance or repair procedure for the components, indicates a listing of a component for purchase, indicates a name and location of a recommended repair service, or the like. In some other examples, the message indicates that the electromechanical device updated one or more system settings for the user.

In some aspects, the techniques described herein relate to a computer-implemented method, including receiving system information data associated with a change in state of one or more components of an electromechanical device, generating a message indicating feedback responsive to the change in state of the one or more components, the generating performed by inputting the system information data as a prompt to generative artificial intelligence representative of one or more characteristics of the electromechanical device, the generative artificial intelligence trained to analyze the system information data, where one or more language characteristics of the message are associated with the one or more characteristics of the electromechanical device, and outputting the message indicating the feedback.

In some aspects, the techniques described herein relate to a computer-implemented method, further including transmitting, for display at a user interface, a request for the one or more characteristics, and in response to the request, receiving user input indicating the one or more characteristics.

In some aspects, the techniques described herein relate to a computer-implemented method, further including determining the one or more characteristics based on using object recognition techniques to analyze an image input associated with the electromechanical device.

In some aspects, the techniques described herein relate to a computer-implemented method, wherein the image input indicates an identifier of the electromechanical device, the computer-implemented method further including accessing a database to obtain the one or more characteristics, the database storing associations between the identifier of the electromechanical device and the one or more characteristics of the electromechanical device.

In some aspects, the techniques described herein relate to a computer-implemented method, further including obtaining purchase history data associated with at least one component of the electromechanical device and determining the one or more characteristics based on the purchase history data.

In some aspects, the techniques described herein relate to a computer-implemented method, wherein outputting the message includes displaying, at a user interface, a text representation of the message.

In some aspects, the techniques described herein relate to a computer-implemented method, wherein outputting the message includes outputting, by an audio component, an audio representation of the message.

In some aspects, the techniques described herein relate to a computer-implemented method, wherein the system information data includes a diagnostic code corresponding to the change in state of the one or more components of the electromechanical device.

In some aspects, the techniques described herein relate to a computer-implemented method, wherein the system information data includes sensor data corresponding to the change in state of the one or more components of the electromechanical device.

In some aspects, the techniques described herein relate to a computer-implemented method, wherein the message includes instructions to perform a maintenance procedure in response to the change in the one or more components of the electromechanical device.

In some aspects, the techniques described herein relate to a computer-implemented method, wherein the message includes instructions to purchase at least one replacement component in response to the change in the one or more components of the electromechanical device.

In some aspects, the techniques described herein relate to a computer-implemented method, further including receiving, as output from the generative artificial intelligence, an indication of a modification to one or more system settings of the electromechanical device based on the change in the one or more components of the electromechanical device, and updating the one or more system settings based on the modification to the one or more system settings, wherein the message indicates the one or more system settings are updated.

In some aspects, the techniques described herein relate to a computer-implemented method, further including obtaining training data including the one or more characteristics of the electromechanical device and instructions corresponding to operation of the electromechanical device and updating one or more large language models using the training data, the generative artificial intelligence including the one or more large language models.

In some aspects, the techniques described herein relate to a computer-implemented method, wherein the one or more characteristics of the electromechanical device include at least one of a date of manufacture of the electromechanical device, a geographic location of manufacture of the electromechanical device, a type of the electromechanical device, purchase history of components of the electromechanical device, or one or more physical characteristics of the electromechanical device.

In some aspects, the techniques described herein relate to a computer-implemented method, wherein the one or more components of the electromechanical device include at least one of hardware components or software components.

In some aspects, the techniques described herein relate to a computer-implemented method, wherein the electromechanical device is a vehicle.

In some aspects, the techniques described herein relate to a system, including one or more processors, and a computer-readable storage medium storing instructions that are executable by the one or more processors to perform operations including receiving system information data associated with a change in state of one or more components of an electromechanical device, generating a message indicating feedback responsive to the change in state of the one or more components, the generating performed by inputting the system information data as a prompt to generative artificial intelligence representative of one or more characteristics of the electromechanical device, the generative artificial intelligence trained to analyze the system information data, where one or more language characteristics of the message are associated with the one or more characteristics of the electromechanical device, and outputting the message indicating the feedback.

In some aspects, the techniques described herein relate to a system, wherein the operations further include transmitting, for display at a user interface, a request for the one or more characteristics, and in response to the request, receiving user input indicating the one or more characteristics.

In some aspects, the techniques described herein relate to a system, wherein the operations further include determining the one or more characteristics based on using object recognition techniques to analyze an image input associated with the electromechanical device.

In some aspects, the techniques described herein relate to one or more computer-readable storage media including computer-executable instructions stored thereon that, responsive to execution by one or more processors, perform operations including obtaining training data including one or more characteristics of an electromechanical device and instructions corresponding to operation of the electromechanical device, updating one or more large language models using the training data, the updated one or more large language models representative of one or more characteristics of the electromechanical device, the generative artificial intelligence trained to analyze system information data associated with a change in state of one or more components of the electromechanical device, receiving the system information data, generating a message indicating feedback responsive to the change in state of the one or more components, the generating performed by inputting the system information data as a prompt to the updated one or more large language models, where one or more language characteristics of the message are associated with the one or more characteristics of the electromechanical device, and outputting the message indicating the feedback.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of a Message Personalization Environment

Figure 1:
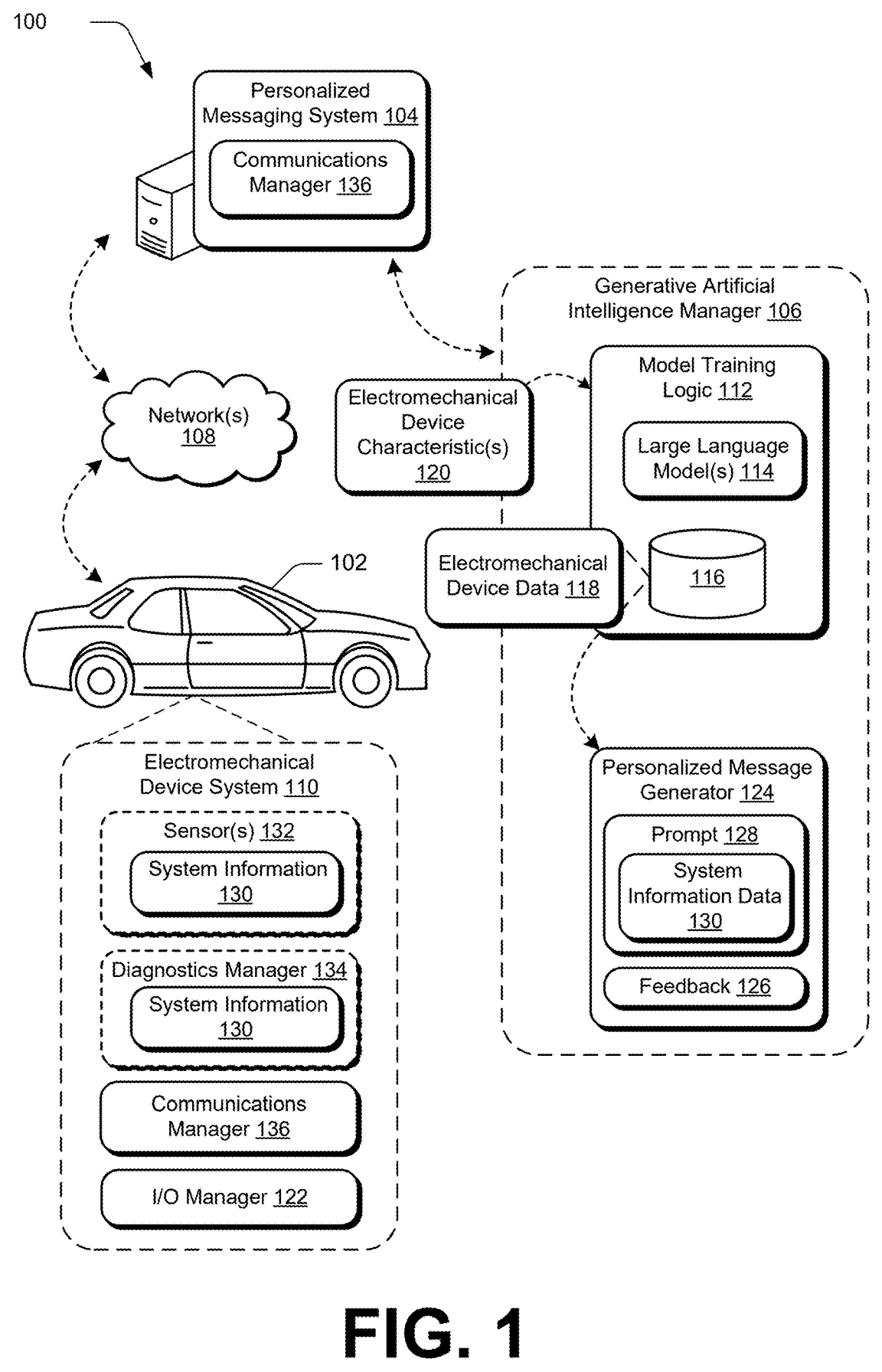

FIG. 1 is an illustration of an environment 100 in an example implementation that is operable to employ techniques described herein. The environment 100 includes an electromechanical device 102 and a personalized messaging system 104. In some examples, the personalized messaging system 104 includes a generative artificial intelligence manager 106 to train, fine-tune, and implement one or more machine learning models. In one or more implementations, the electromechanical device 102 and the personalized messaging system 104 are communicatively coupled, one to another, via network(s) 108. One example of the network(s) 108 is the Internet, although the electromechanical device 102 and the personalized messaging system 104 may be communicatively coupled using one or more different connections or different networks (e.g., wireless networks) in various implementations.

Although the personalized messaging system 104 is depicted in the environment 100 as being separate from the electromechanical device 102, in one or more implementations, an entirety, or various portions of the personalized messaging system 104 are implemented at or by the electromechanical device 102. In at least one implementation, for example, at least a portion of the personalized messaging system 104 is implemented by an electromechanical device system 110 of the electromechanical device 102 and/or using various resources of the electromechanical device 102, such as hardware resources, an operating system, firmware, and so forth. Alternatively, or additionally, the personalized messaging system 104 is implemented by resources (e.g., server-based storage, processing, and so on) different from the electromechanical device system 110. For example, at least a portion of the personalized messaging system 104 is implemented using a third-party service, such as a web services platform that provides one or more hardware and/or other computing resources to support provision of services by web service providers. In variations, an entirety, or various portions of the personalized messaging system 104 are implemented at or by a device of the user (e.g., a mobile device, a laptop, a wearable device, or any other device).

An electromechanical device 102 that implement the environment 100 is configurable in a variety of ways. An electromechanical device 102, for instance, is configurable as a vehicle (e.g., automobile, boat, plane, etc.), a manufacturing equipment, a construction equipment, or any other device that includes electrical and mechanical components. Thus, an electromechanical device 102 includes devices with varying levels of memory and processing resources, as well us varying numerical quantity of components. Additionally, although in instances in the following discussion reference is made to an electromechanical device in the singular, an electromechanical device is also representative of a plurality of different devices. Similarly, the personalized messaging system 104 can represent multiple servers of a server farm utilized to perform operations "over the cloud" as further described with reference to FIG. 9.

In one or more implementations, the personalized messaging system 104 implements a generative artificial intelligence manager 106 that trains, fine-tunes, and implements machine learning models. In this example, the generative artificial intelligence manager 106 includes or otherwise has access to the model training logic 112. The generative artificial intelligence manager 106 can utilize the model training logic 112 to train or fine-tune one or more large language models 114 using generative artificial intelligence. A large language model 114 is a type of artificial intelligence model designed to generate natural language. The large language model 114 is built using deep learning techniques and can have a greater numerical quantity of parameters than other artificial intelligence models. Unlike conventional artificial intelligence systems that rely on rule-based or deterministic approaches, generative artificial intelligence employs algorithms and models capable of autonomously producing output that closely resembles human-generated content. These algorithms are designed to learn patterns and structures from existing data and then use this learned information to generate new content that is coherent, relevant, and contextually appropriate.

Although the techniques are described leveraging generative artificial intelligence, in variations, different types of artificial intelligence may be leveraged without departing from the spirit or scope of the described techniques. For example, the generative artificial intelligence manager 106 may train and/or fine-tune any numerical quantity of large language models 114, such as to generate a distributed network of large language models 114. The distributed network may include a prompt engineer large language model 114 that generates prompts for other large language models 114 that generate results. The large language models 114 that generate the results can be trained or fine-tuned to provide recommendations for a respective component of the electromechanical device 102.

In some examples, a large language model 114 can be fine-tuned, or trained, for a specific application using data for the specific application. Fine-tuning a large language model 114 may include updating an existing, or pre-trained, large language model 114 by training the large language model 114 with a more specific dataset to adapt the large language model 114 to a task or context. The model training logic 112 is configured to access a storage device 116, which is depicted maintaining electromechanical device data 118, by executing a retrieve command to obtain the electromechanical device data 118. The storage device 116 may represent one or more databases and/or other types of storage capable of storing the electromechanical device data 118. Examples of the storage device 116 include, but are not limited to, mass storage and virtual storage. In one or more implementations, for example, the storage device 116 may be virtualized across multiple data centers and/or cloud-based storage devices. In some examples, the electromechanical device data 118 includes manuals or other instructional documents for operation of the components of the electromechanical device 102, repair instructions for performing repair procedures on the components of the electromechanical device 102, maintenance instructions for performing maintenance procedures on the components of the electromechanical device 102, among other data related to the features, operation, repair, and maintenance of the components of the electromechanical device 102.

Additionally, or alternatively, the model training logic 112 can be configured to receive electromechanical device characteristics 120, such as by requesting user input indicating the electromechanical device characteristics 120 and/or transmitting a request to the electromechanical device system 110 to report the electromechanical device characteristics 120. In some examples, the electromechanical device characteristics 120 include a date of manufacture of the electromechanical device 102, a geographic location of manufacture of the electromechanical device 102, physical characteristics of the electromechanical device 102, a name of the electromechanical device 102, a personality of the electromechanical device 102, purchase history data related to purchases of components for the electromechanical device 102, or any combination thereof. Example physical characteristics of the electromechanical device include, but are not limited to, a type of the electromechanical device 102, a color of components of the electromechanical device 102, a size of the electromechanical device 102, a condition of the electromechanical device, and a shape of the electromechanical device 102. The personalized messaging system 104 can access the purchase history if the personalized messaging system 104 by requesting access to account information of the user and/or application data for a marketplace application accessed by a user for purchases.

In some examples, the personalized messaging system 104 and/or the electromechanical device system 110 can analyze image data to determine the electromechanical device characteristics 120. For example, a user may provide user input including one or more images of components of the electromechanical device 102. The user may provide the input via an interface of the electromechanical device system 110 and/or via an interface of another device in communication with the electromechanical device system 110. The personalized messaging system 104 and/or the electromechanical device system 110 can utilize image processing tools (e.g., object recognition) to determine characteristics of the electromechanical device 102 and/or an identifier of the electromechanical device 102. The identifier can include a vehicle identification number (VIN) and/or a license plate value if the electromechanical device 102 is a vehicle. In some cases, the personalized messaging system 104 and/or the electromechanical device system 110 can access a database storing associations between the identifier of the electromechanical device 102 and one or more characteristics of the electromechanical device 102 to obtain the characteristics.

In variations, the personalized messaging system 104 transmits a request for user input indicating the electromechanical device characteristics 120 to the electromechanical device system 110 and/or to a device of a user of the electromechanical device 102. The electromechanical device system 110 includes an input/output (I/O) manager 122 configured to display, or otherwise present, the request for the user input to a user of the electromechanical device 102. In some examples, the I/O manager 122 displays the request to the user via a graphical user interface (GUI) of the electromechanical device 102. In some other examples, the I/O manager displays the request to the user via a GUI of another device communicatively coupled with the electromechanical device 102 (e.g., a mobile device coupled with the electromechanical device 102 via the networks 108). The I/O manager can visually display the request, can emit an audio version of the request via a speaker component, or the like.

The I/O manager 122 receives user input in response to the request. Examples of such input include, but are not limited to, receiving touch input in relation to portions of a displayed user interface, receiving one or more voice commands, receiving typed input (e.g., via a physical or virtual ("soft") keyboard), receiving mouse or stylus input, and so forth. For example, a user may interact with interactable elements of the GUI to input the electromechanical device characteristics 120 (e.g., fill in a text element, elect a selectable element, or the like). The I/O manager 122 can store the electromechanical device characteristics 120 (e.g., at a local database) for access upon request by the personalized messaging system 104. Although the request for electromechanical device characteristics 120 is illustrated as being performed by the I/O manager 122 of the electromechanical device system 110, the request for electromechanical device characteristics 120 can additionally, or alternatively, be performed by a different system or device, such as a mobile device of the user.

Once the generative artificial intelligence manager 106 of the personalized messaging system 104 obtains the electromechanical device characteristics 120, the personalized messaging system 104 can instruct the generative artificial intelligence manager 106 to generate a personalized messaging model for the electromechanical device 102. For example, the model training logic 112 can include instructions to input the electromechanical device characteristics 120 and/or the electromechanical device data 118 to one or more large language models 114 during a fine-tuning procedure to generate a personalized messaging model, which is described in further detail with respect to FIG. 2. In some examples, the personalized messaging model is unique to the electromechanical device 102 and/or to a user of the electromechanical device 102 due to being trained on the electromechanical device characteristics 120 (e.g., input by the user) that are unique to the electromechanical device 102, such that each electromechanical device 102 may have a different personalized messaging model. The personalized messaging model is trained to output unique messages that reflect the characteristics of the electromechanical device 102 because the personalized messaging model is trained on the electromechanical device characteristics 120. The personalized messaging model can implement any numerical quantity of large language models 114.

Figure 3:
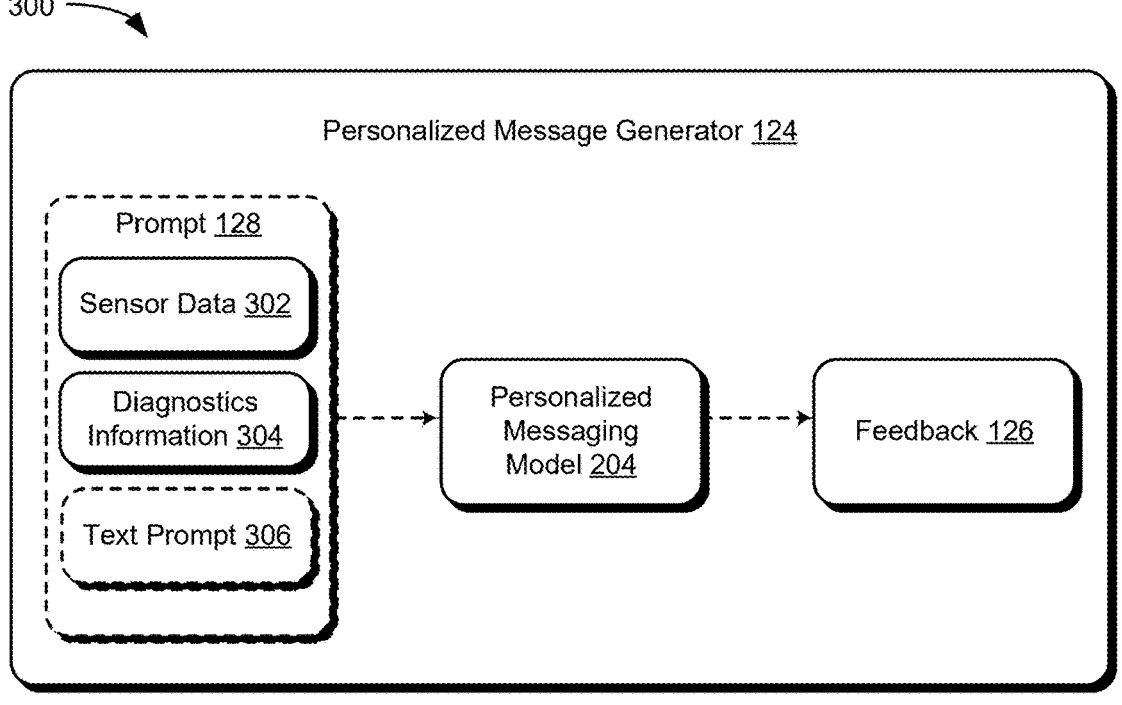
FIG. 3 depicts an example of a personalized message generator for message personalization for an electromechanical device.

In some cases, a personalized message generator 124 of the personalized messaging system 104 utilizes the personalized messaging model to generate feedback 126, which is described in further detail with respect to FIG. 3. The personalized message generator 124 can input a prompt 128 to the personalized messaging model, and the personalized messaging model generates the feedback 126 as output. In one or more implementations, the personalized messaging system 104 may implement the generative artificial intelligence manager 106 by using servers that execute stored instructions to deploy various services of the personalized messaging system 104, such that those services perform numerous computations which are effective to provide the functionality described above and below. It is to be appreciated that the generative artificial intelligence manager 106 may include more, fewer, or different components without departing from the spirit or scope described herein.

In some examples, the prompt 128 includes system information data 130 that represents one or more changes in state of at least one component of the electromechanical device 102. For example, the system information data 130 can include sensor data from one or more sensors 132 monitoring components of the electromechanical device 102 and/or a diagnostic code from a diagnostics manager 134 of the electromechanical device system 110.

In some examples, the sensors 132 of the electromechanical device system 110 include, but are not limited to, temperature sensors, force sensors, camera imaging sensors, pressure sensors, speed and motion sensors, position sensors, oxygen sensors, acceleration and inertial sensors, light sensors, or fluid level sensors. The sensors 132 are designed to collect data used by the electromechanical device system 110 to monitor a state of components of the electromechanical device 102. The sensors 132 can be located at any physical location, including within or outside of the electromechanical device 102. There may be any numerical quantity of sensors 132 collecting data accessible by the electromechanical device system 110.

A temperature sensor can measure a temperature of operating fluids used by the components of the electromechanical device 102, a temperature of the components themselves, and/or an environmental temperature at the components of the electromechanical device 102. For example, the electromechanical device 102 can include temperature sensors to monitor engine coolant. If the temperature of the engine coolant exceeds a threshold or recommended temperature (e.g., set by a manufacturer of the electromechanical device 102), then the state of the engine of the electromechanical device 102 can change from a normal operating state to a malfunctioning (e.g., overheated) operating state, potentially causing damage to the engine. Similarly, if an air temperature exceeds a threshold value, then the state of a component of the electromechanical device 102 can change from the normal operating state to the malfunctioning operating state.

A force sensor can measure a force applied to a component of the electromechanical device 102. For example, one or more force sensors measure a force applied to a seat, on a door handle, or the like. The electromechanical device system 110 can use the force measurement to determine a change in state of the door from closed to open or a change in state of the seat from unoccupied to occupied, or vice-versa. The change in state can indicate to the electromechanical device system 110 that a user has entered the electromechanical device 102, and in some cases, the electromechanical device system 110 can use the values of the force measurements to determine an identity of the user.

In some cases, a camera imaging sensor collects images, and the electromechanical device system 110 determines a change in state of a component of the electromechanical device 102 by comparing the images to detect changes between the images. For example, if the image is of an interior of the electromechanical device 102, and a user enters the electromechanical device 102, then a comparison of an image prior to the user entering the electromechanical device 102 and an image after the user enters the electromechanical device 102 could indicate that an occupancy state of the electromechanical device 102 has changed state from unoccupied to occupied. The electromechanical device system 110 can further analyze the images collected by the camera sensors to determine an identity of a user of the electromechanical device 102 by comparing the characteristics of the user captured by the image to a known list of users of the electromechanical device 102. The analysis and/or comparison of the images collected by the camera sensor can be performed by the electromechanical device system 110 and/or the personalized messaging system 104 using camera image processing techniques, such as feature detection techniques, object recognition techniques, or the like.

A pressure sensor collects pressure data for components of the electromechanical device 102, such as a pressure in an intake manifold of an engine of the electromechanical device 102 and/or tire pressure. A change in the pressure of the components can result in a change in state of the component. For example, a decrease or increase in tire pressure cause a state change of the tire and a decrease or increase in pressure for air intake can cause an operation state of the engine to change, accordingly.

A speed sensor can measure a speed of different components of the electromechanical device 102. For example, a wheel speed sensor measures a rotational speed of a wheel of the electromechanical device 102. Changes to the rotational speed of the wheel of the electromechanical device 102 can result in a change of state of the wheel (e.g., a normal operating state to a malfunctioning operation state). A position sensor can measure a physical location of a component of the electromechanical device 102. For example, a position sensor can measure a throttle position to control fuel injection and engine performance and/or can be used by the electromechanical device system 110 to determine the position of components of the electromechanical device 102 for ignition timing and fuel injection. An oxygen sensor can measure an amount of oxygen, such as an amount of oxygen in the exhaust gases of the electromechanical device 102, which the electromechanical device system 110 can use for determining a state of the engine for fuel injection.

An acceleration and inertial sensor can include one or more accelerometers for measuring changes in acceleration of components of the electromechanical device 102. In some examples, if the electromechanical device 102 is a vehicle, then the electromechanical device system 110 utilizes the acceleration and inertial sensors to determine a state of airbag components of the vehicle (e.g., deployed or not deployed).

A light sensor of the electromechanical device 102 can detect changes in ambient light and/or rain. The changes in ambient light or detection of rain can result in a change of state of interior lighting components, exterior lighting components, windshield wiper components, or the like of the electromechanical device 102 (e.g., an on state or an off state). A fluid sensor can measure an amount of fluid at one or more components of the electromechanical device 102, such as engine oil level, brake fluid level, or the like. If there is a change in measurements of the fluid, then there is also a resulting change in state of the component (e.g., a change in state from a normal operating level of fluid to a low operating level of fluid). For example, if a change in oil level decreases below a threshold value, then the state of the engine can change from a normal operating state to a failure state. It is to be appreciated that the sensor data indicating a change in state of a component of the electromechanical device 102 may include additional, or alternative, examples without departing from the spirit or scope described herein.

In some examples, the system information data 130 includes diagnostic codes collected by a diagnostic tool. A diagnostics manager 134 of the electromechanical device system 110 can be in wired or wireless communication with a diagnostics tool or can implement a diagnostics tool. Examples of a diagnostics tool or system include, but are not limited to an OBD tool or system, such as an OBD-II tool or system. The diagnostics tool can be utilized to obtain (e.g., read) one or more diagnostic codes. Although the diagnostics manager 134 is illustrated as being implemented by the electromechanical device system 110, the diagnostics manager 134 may additionally, or alternatively, be implemented by the personalized messaging system 104.

In some cases, the diagnostics tool is utilized to monitor the performance of components of the electromechanical device 102, such as an engine. The diagnostics tool generates a diagnostic code when a potential issue is detected. The diagnostic code may be an alphanumeric code, where the first character indicates the system affected by the potential issue and the following characters provide specific information about the issue. For example, in a code "P0301," the "P" stands for powertrain, and the "0301" indicates a misfire in cylinder 1. The diagnostic code may be referenced in a database (e.g., the storage device 116 storing electromechanical device data 118) with a list of potential causes and recommended diagnostic and repair procedures. In some examples, the diagnostics tool can include multifaceted connectors that couple with control panels of different components of the electromechanical device 102. The diagnostics tool can utilize the connectors to control the components of the electromechanical device 102 (e.g., move a seat position, update a display, shut down an engine, etc.).

In some examples, one or more components of an electromechanical device 102 experience failures, including mechanical and software failures. For example, a component can degrade over time, eventually leading to failure resulting in repair or replacement. In one or more implementations, components of an electromechanical device 102 can be maintained to prevent premature failure and/or to improve operating efficiency of the components. The electromechanical device system 110 can collect sensor data from the sensors 132 and/or the diagnostics manager 134 can obtain a diagnostic code. The sensor data and/or the diagnostic code may indicate a component failure and/or may be used to track maintenance for components of the electromechanical device.

In one or more implementations, an I/O manager 122 displays, or otherwise presents, the diagnostic code, an indication of a component failure, and/or an indication that a component is due for a maintenance procedure (e.g., via a user interface). However, the diagnostic code, the indication of the component failure, and/or the indication that the component is due for maintenance may be difficult to interpret by a user of the electromechanical device 102 and/or by an agent responsible for maintaining or repairing the electromechanical device 102. Further, the electromechanical device 102 may be unable to acquire additional system information data from the sensors 132 and/or the diagnostics manager 134 related to a schedule for recommended maintenance procedures or a recommended repair for a detected component failure. Displaying information that is difficult to interpret and/or failing to provide additional system information data may cause further damage of the components of the electromechanical device and increased usage of computing resources due to inquiries related to the indication, among other disadvantages.

In one or more implementations, different users may operate, or otherwise interact with, an electromechanical device 102, where each user may have a preferred set of system settings for the electromechanical device system 110. For example, users may have preferences for seat position, environment settings, such as temperature, display configuration settings, and the like. However, the electromechanical device system 110 may be unable to detect and/or process data related to which user is operating the electromechanical device 102, resulting in additional wear to the components due to manual adjustment of the system settings, as well as increased processing power due to initializing the system using different settings than preferred by the user (e.g., initializing a display configuration and then updating the display configuration as a user inputs preferences utilizes computer processing resources).

Thus, to solve the problems associated with maintenance, failure, and/or manual adjustment of components of an electromechanical device 102, the electromechanical device system 110 communicates with a personalized messaging system 104 to generate personalized messages including feedback 126. In some cases, if the system information data 130 includes a diagnostic code, the feedback 126 generated by the personalized message generator 124 includes the potential causes and recommended diagnostic and repair procedures. The content of the feedback 126 includes a message that is personalized using the electromechanical device characteristics 120 and indicates the potential causes and recommended diagnostic and repair procedures for the diagnostic code. In some other cases, if the system information data 130 includes sensor data in addition to, or as an alternative to, the diagnostic code, then the feedback 126 generated by the personalized message generator 124 includes a message related to the state change of one or more components and is personalized using the electromechanical device characteristics 120, which is described in further detail with respect to FIGS. 4, 5, and 7.

In some examples, the personalized messaging system 104 and the electromechanical device system 110 implement a communications manager 136 to support communication of data across the network(s) 108 between the electromechanical device 102 and the personalized messaging system 104. By supporting such data communication, the communications manager 136 provides the electromechanical device system 110 access to message generation techniques otherwise inaccessible by the electromechanical device system 110. In one or more implementations, the electromechanical device system 110 and the personalized messaging system 104 exchange data using the communications manager 136 (e.g., data including the electromechanical device characteristics 120, the electromechanical device data 118, the system information data 130, among other examples). Further, the communications manager 136 of the personalized messaging system 104 can send the feedback 126 to the communications manager 136 of the electromechanical device system 110. The I/O manager 122 of the electromechanical device system 110 can display the feedback 126 to a user via a GUI of the electromechanical device 102, via a visual display of one or more connected devices (e.g., an extended reality device as described in further detail with respect to FIGS. 5 and 6), via an audio component of the electromechanical device 102 (e.g., a speaker as described with reference to FIGS. 4 and 7), an audio component of another device, or any combination thereof.

In some examples, the feedback 126 includes a listing for sale of a component to replace a component that is malfunctioning. The listing can include the component and tools for installing the component. In some other examples, the electromechanical device system 110 and/or the personalized messaging system 104 can automatically order a component for replacement (e.g., independent of user input) and can generate a message including the feedback 126 that updates the user of the purchase details. For example, the message indicating the feedback 126 may include the text "I'm not feeling great. I think my oil should be replaced. I've ordered a replacement product, which should be arriving this Thursday." The user may configure the electromechanical device system 110 and/or the personalized messaging system 104 to automatically submit the order for the component. For example, the user can provide user input updating one or more system settings (e.g., preferences) to indicate for the electromechanical device system 110 and/or the personalized messaging system 104 to submit the order without prompting the user for approval and/or to prompt the user for approval prior to submitting the order.

The I/O manager 122 and/or an I/O manager of another device of the user can display the listing for sale of the component and/or tools for installing the component to a user of the electromechanical device 102 with a selectable option (e.g., a button) to confirm or cancel purchase of the component. The user may provide input to cancel the purchase of respective components or tools, confirm the purchase of respective components or tools, or may ask for additional information. For example, the message indicating the feedback 126 may include the text "I'm not feeling great. I think my oil should be replaced. Can you order this replacement oil?" Below the text, the I/O manager 122 and/or an I/O manager of another device of the user can display the listing for sale of the component (e.g., the oil compatible with the electromechanical device 102), which is described in further detail with respect to FIG. 6.

In one or more implementations, the I/O manager 122 continues to monitor for additional user input after providing the feedback 126 to the user (e.g., via a message on a visual display and/or an audio message output from a speaker). If the user responds to the feedback 126 by providing user input, the I/O manager 122 of the electromechanical device system 110 may send the response to the personalized messaging system 104 for generating an additional personalized message to provide to the user based on the response.

In some examples, the personalized messaging system 104 is implemented at an application layer, such as part of a chat interface on a mobile device. A user can interact with the personalized messaging system 104 in real time to simulate a "chat" or conversation with the electromechanical device 102. The messages generated by the personalized messaging system 104 simulate a persona (e.g., mood and personality) of the electromechanical device 102 by representing characteristics of the electromechanical device 102 via the generative artificial intelligence manager 106.

The personalized messaging system 104 may offer different suggestions or feedback 126 to different users. For example, the personalized messaging system 104 determines an identity of a user (e.g., via sensor data and/or by determining a wireless connection that is registered to a device of a user) and can adjust the feedback 126 based on an authorization level of the user and/or based on the identity of the user. A user may set an authorization level of the user during an initialization or setup process of the electromechanical device system 110 and/or the personalized messaging system 104 and/or may specify a level of feedback 126 to provide to different users. For example, the owner of the electromechanical device 102 may be a first user, and the owner may specify for the electromechanical device system 110 and/or the personalized messaging system 104 to refrain from notifying a second user of maintenance and/or repair issues. Instead, the first user may instruct the personalized messaging system 104 to notify the first user of the maintenance and/or repair issues.

Having considered an example of an environment, consider now a discussion of some example details of the techniques for message personalization for an electromechanical device in accordance with one or more implementations.

Message Personalization for an Electromechanical Device

FIG. 2 depicts an example 200 of model training logic 112 for message personalization for an electromechanical device.

In one or more implementations, the model training logic 112 may be an example of the model training logic 112 as described with reference to FIG. 1. For example, the model training logic 112 is configured to access data for training one or more large language models 114, where the data includes electromechanical device data 118 and/or electromechanical device characteristics 120 as described with reference to FIG. 1.

In some examples, the model training logic 112 includes instructions to send a message to a device of a user to request user input 202 for training the large language models 114. In response, the model training logic 112 receives user input 202 that includes the electromechanical device characteristics 120. For example, the device of the user displays interactable elements of a user interface to retrieve user input 202 indicating the electromechanical device characteristics 120.

In some other examples, the model training logic 112 is configured to obtain the electromechanical device characteristics 120 by using one or more identifiers of an electromechanical device (e.g., VIN and/or license plate value). In variations, the model training logic 112 can include instructions to request identifiers and/or characteristics from a system of the electromechanical device and/or can determine the identifiers by processing image input including the identifiers. The electromechanical device can respond by providing the identifiers and/or the image input to the model training logic 112. In the example where the electromechanical device is a vehicle, the model training logic 112 includes accessing a database to obtain the electromechanical device characteristics 120 for the vehicle with the VIN or license plate value.

In some cases, the model training logic 112 can obtain the characteristics by performing object and/or attribute recognition analysis on one or more images of components of the electromechanical device. For example, the model training logic 112 can determine a color of the components of the electromechanical device, a shape of the electromechanical device, a make and/or model of the electromechanical device, among other attributes. The model training logic 112 can receive the images from a user via a user interface. Additionally, or alternatively, the model training logic 112 can obtain purchase history (e.g., transaction data) for components of the electromechanical device, and can determine attributes of the electromechanical device based on the product descriptions of components previously purchased for the electromechanical device. For example, a product description can include a color, a make, a model, a weight, a price, among other information for the component and/or electromechanical device.

In some examples, the model training logic 112 includes instructions for accessing a database to obtain stored electromechanical device data 118. The database may be an example of a storage device 116 as described with reference to FIG. 1. The model training logic 112 generates a personalized messaging model 204 by training or fine-tuning one or more large language models 114 using the electromechanical device characteristics 120 and using the electromechanical device data 118. In some examples, the large language models 114 are pre-trained on a diverse text data set to learn structure, grammar, and semantics of language.

The model training logic 112 utilizes a training dataset including the electromechanical device data 118 and the electromechanical device characteristics 120 to fine-tune the pre-trained large language models 114. The large language models 114 are trained on the training dataset at a lower learning rate than during the pre-training phase (e.g., by adjusting parameters of the model in relatively small steps), such that the large language models 114 become a personalized messaging model 204 capable of generating feedback related to a state of components of an electromechanical device. The personalized messaging model 204 can be an example of a distributed neural network including multiple large language models 114 and/or can include a single large language model 114.

By utilizing the electromechanical device data 118 to train the personalized messaging model 204, the personalized messaging model 204 can predict a state of different components of the electromechanical device using system information data from the electromechanical device. Further, by using the electromechanical device characteristics 120 to train the personalized messaging model 204, the messages are unique and dependent on the characteristics of the electromechanical device. For example, the language characteristics of the content of a message from an electromechanical device may be different than the language characteristics of the content of a message from a different electromechanical device. The language characteristics can include tone, gender, age, word choice, accent, among other language characteristics.

For example, if the user input 202 indicates the electromechanical device is from a geographic location and a manufacturing year of the electromechanical device, then messages generated by the personalized messaging model 204 for the electromechanical device can have language characteristics from that geographic location and that manufacturing year. Additionally, or alternatively, the user input 202 can include a preference for one or more language characteristics. For example, a user may indicate a preference for the messages generated by the personalized messaging model 204 to have characteristics of a specific geographic region (e.g., a country, a state, a city, etc.) for an electromechanical device via the user input 202.

FIG. 3 depicts an example 300 of a personalized message generator 124 for message personalization for an electromechanical device.

In one or more implementations, the personalized message generator 124 may be an example of the personalized message generator 124 as described with reference to FIG. 1. For example, the personalized message generator 124 inputs data as a prompt to a personalized messaging model 204 to generate feedback 126, where the feedback 126 may be an example of the feedback 126 as described with reference to FIG. 1 and the personalized messaging model 204 may be an example of a personalized messaging model 204 as described with reference to FIG. 2.

In some examples, the personalized message generator 124 determines, receives, or otherwise obtains system information data about one or more components of an electromechanical device. For example, the system information data may include sensor data 302 collected by sensors (e.g., sensors 132 as described with reference to FIG. 1) measuring data related to a state of components of the electromechanical device. Additionally, or alternatively, the system information data can include diagnostics information 304, such as a diagnostic code. The personalized message generator 124 can input the system information data to generative artificial intelligence (e.g., a personalized messaging model 204).

In some cases, if the system information data includes sensor data 302, the personalized messaging model 204 can parse the sensor data 302 to determine a current, or anticipated, state of the components. Additionally, or alternatively, the personalized message generator 124 can parse the sensor data 302 to determine a current or anticipated state of the components prior to inputting the sensor data 302 to the personalized messaging model 204. For example, the personalized message generator 124 can compare the sensor data 302 to one or more manufacturer recommendations (e.g., operating limits for the components) to determine whether the sensor data 302 is within a safe operating threshold state. The personalized message generator 124 can input the state of the components to the personalized messaging model 204 rather than the raw data.

In some examples, the prompt 128 includes a text prompt 306 from a user of the electromechanical device. For example, one or more audio sensors of the electromechanical device (e.g., microphones) may detect audio data indicating speech from a user. A system of the electromechanical device and/or a personalized messaging system can convert the audio data to a text prompt 306 for input to the personalized messaging model 204. In some other examples, a system of the electromechanical device may receive the text prompt 306 as an input to a user interface from a user.

The personalized message generator 124 builds the prompt 128 by combining the sensor data 302, the diagnostic information 304, and/or the text prompt 306. As a non-limiting example, the sensor data 302 may indicate that a state of the engine is an overheating state, and the text prompt 306 may include a text string "Vehicle, why is my check engine light on?" The personalized message generator 124 can combine the sensor data 302 and the text prompt 306 to generate a prompt 128, such as a request to provide feedback for maintenance or repair related to the check engine light being on and an indication that the engine is overheating. The personalized message generator 124 provides the prompt 128 as input to the personalized messaging model 204. It is to be appreciated that the prompt 128 may vary from the example provided just above without departing from the spirit or scope of the techniques described herein.

The personalized messaging model 204 generates a message including feedback 126, such as a recommended maintenance or repair procedure and/or an indication of a status change of one or more components, among other feedback 126. The language characteristics of the content of the message may be unique to the electromechanical device and/or to the user, as described with reference to FIGS. 1 and 2. The personalized message generator 124 can send the message to the electromechanical device and/or to a device of a user for presentation to the user. For example, the electromechanical device and/or the device displays the message via a GUI. Additionally, or alternatively, the electromechanical device and/or the device outputs an audio message via a speaker that indicates the message.

Figure 4:
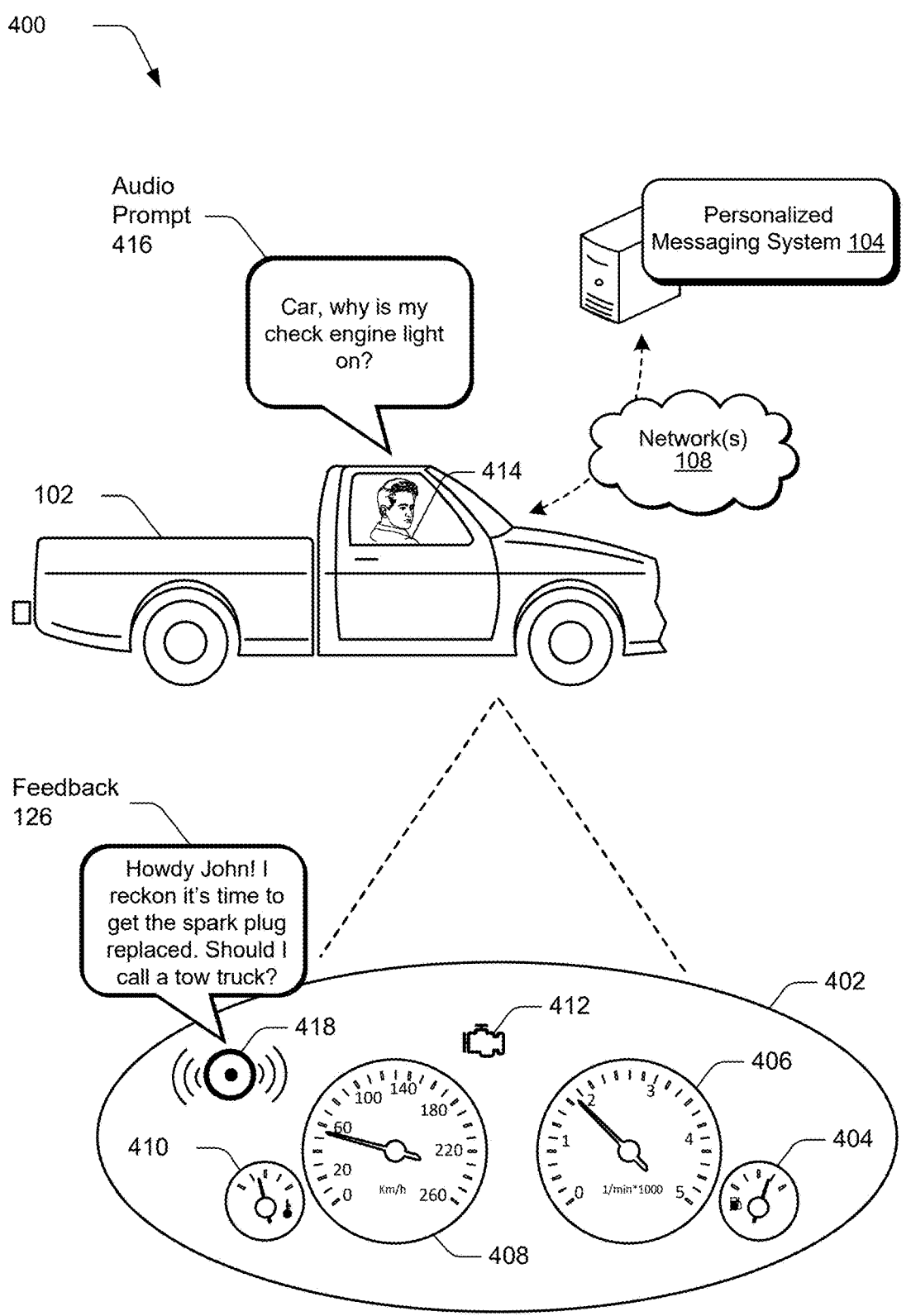
FIG. 4 depicts an example system for message personalization for an electromechanical device.

FIG. 4 depicts an example 400 of a system for message personalization for an electromechanical device.

The illustrated example 400 includes an electromechanical device 102 and a personalized messaging system 104 in communication via one or more networks 108, which may be examples of the corresponding features as described with reference to FIG. 1. Although the electromechanical device 102 is illustrated a as an automobile (e.g., a truck), the electromechanical device 102 may be any type of electromechanical device 102 or numerical quantity of electromechanical devices 102. In some examples, the electromechanical device 102 displays a system view 402 for monitoring one or more components of the electromechanical device 102 and/or tracking a speed of the electromechanical device 102. For example, if the electromechanical device 102 is a vehicle, then a system view 402 of the vehicle displays a state of a fuel tank as a dial indicator 404, a tachometer 406 for indicating revolutions per minute (RPM) of the engine of the vehicle, a speedometer 408 for indicating the speed of the vehicle, and an oil temperature indicator 410. In one or more implementations, the system view 402 may include additional, or alternative, elements to the elements displayed in the system view 402 illustrated in the example 400.

In some examples, a state of a component of the electromechanical device 102 can change. For example, a state of operation of a component can change and/or a physical characteristic of a component can change. If a malfunction occurs for a component, then a state of the component can change from normal operating conditions to malfunctioning operating conditions. In some examples, the malfunction can result in failure of operation of a component of the electromechanical device 102, such that the components cease operation altogether. For example, an engine malfunction in a vehicle (e.g., due to overheating, low oil pressure, timing belt failure, transmission failure, fluid leaks, electrical system failure etc.) may cause the engine to stop running.

The system view 402 may display an icon 412 indicating a category of malfunction. For example, a check engine light displayed at a system view 402 of a vehicle can indicate to a user 414 that a failure and/or malfunction has occurred at an engine component of the electromechanical device 102. However, the user 414 may be unable to determine additional information about the type of failure or malfunction from the system view 402. Further, the user 414 may be unable to determine what repair procedure to implement to correct the failure or malfunction, resulting in further damage to the electromechanical device 102 (e.g., because a user may continue to operate the electromechanical device 102 and/or may incorrectly diagnose the failure or malfunction), as well as inefficient use of computing resources (e.g., processor and memory resources) to search for recommendations regarding the failure or malfunction.

Thus, to prevent, or reduce, incurring further damage to the components of the electromechanical device 102, as well as to reduce use of computational resources, the electromechanical device 102 can implement a personalized messaging system 104 to generate personalized messages for providing feedback 126 to a user 414. In some cases, a sensor of the electromechanical device 102 captures an audio prompt 416 spoken by a user 414. A system of the electromechanical device 102 and/or the personalized messaging system 104 can convert the audio prompt 416 to a text prompt (e.g., a text prompt 306) as described with reference to FIG. 3. The audio prompt 416 can trigger generation of a personalized message including feedback 126. In some other cases, a system of the electromechanical device 102 monitors system information data (e.g., sensor data and/or diagnostic codes) to detect maintenance issues, malfunction, and/or failure of the components of the electromechanical device 102. Thus, a change in a state of a component can trigger the generation of a personalized message.

In examples where the user 414 provides an audio prompt 416, the system of the electromechanical device 102 can send a text prompt converted from the audio prompt 416 and/or system information data of the electromechanical device 102 to the personalized messaging system 104 for generation of the message. For example, the audio prompt 416 can include the text "Car, why is my check engine light on?" in response to the icon 412 being displayed on the system view 402. The electromechanical device 102 can collect sensor data, including sensor data related to engine functions, and send the sensor data as well as the text prompt to the personalized messaging system 104. The personalized messaging system 104 can input the sensor data and/or the text prompt to a personalized messaging model (e.g., a personalized messaging model 204), as described with reference to FIG. 3.

In some examples, the personalized messaging model generates a message including feedback 126, which may be an examples of the feedback 126 as described with reference to FIGS. 1 through 3. The personalized messaging system 104 sends the message to the electromechanical device 102 and/or to another device for presentation to the user 414. For example, the personalized messaging system 104 sends the message to an extended reality device of the user 414 if the user 414 is using the extended reality device at the time the personalized messaging system 104 sends the message. Transmission of the message to the extended reality device and presentation of the message to the user via the extended reality device is described in further detail with respect to FIGS. 5 and 6, respectively.

In some examples, if the personalized messaging system 104 sends the message to the electromechanical device 102, the system of the electromechanical device 102 presents the message to the user 414. An audio output component 418 of the electromechanical device 102 (e.g., a speaker) can provide an audio output of an audio representation of the message to the user 414. Additionally, or alternatively, a GUI of the electromechanical device 102 can display a text representation of the message to the user 414. The message can include language characteristics unique to the electromechanical device 102, as well as a recommendation in response to the audio prompt 416 and/or system information data. For example, the electromechanical device 102 can display and/or output the message including the feedback 126 "Howdy John! I reckon it's time to get the spark plug replaced. Should I call a tow truck?"

In some examples, the electromechanical device 102 can detect the identity of the user 414 (e.g., "John") by using image processing techniques on images collected by a camera sensor of the electromechanical device 102, voice recognition techniques from audio collected by a microphone of the electromechanical device 102, weight sensors, among other sensor data. The user 414 can specify one or more characteristics of the electromechanical device 102 via a user interface collecting user input. For example, the user 414 can specify a name of the electromechanical device 102 as "Car," a type of the electromechanical device 102 as "truck," a location and date of manufacture of the electromechanical device 102, among other characteristics.

The user 414 may provide additional audio prompts 416, and the electromechanical device 102 can continue to utilize the personalized messaging system 104 to generate personalized messages in response to the additional audio prompts 416.

Figure 5:
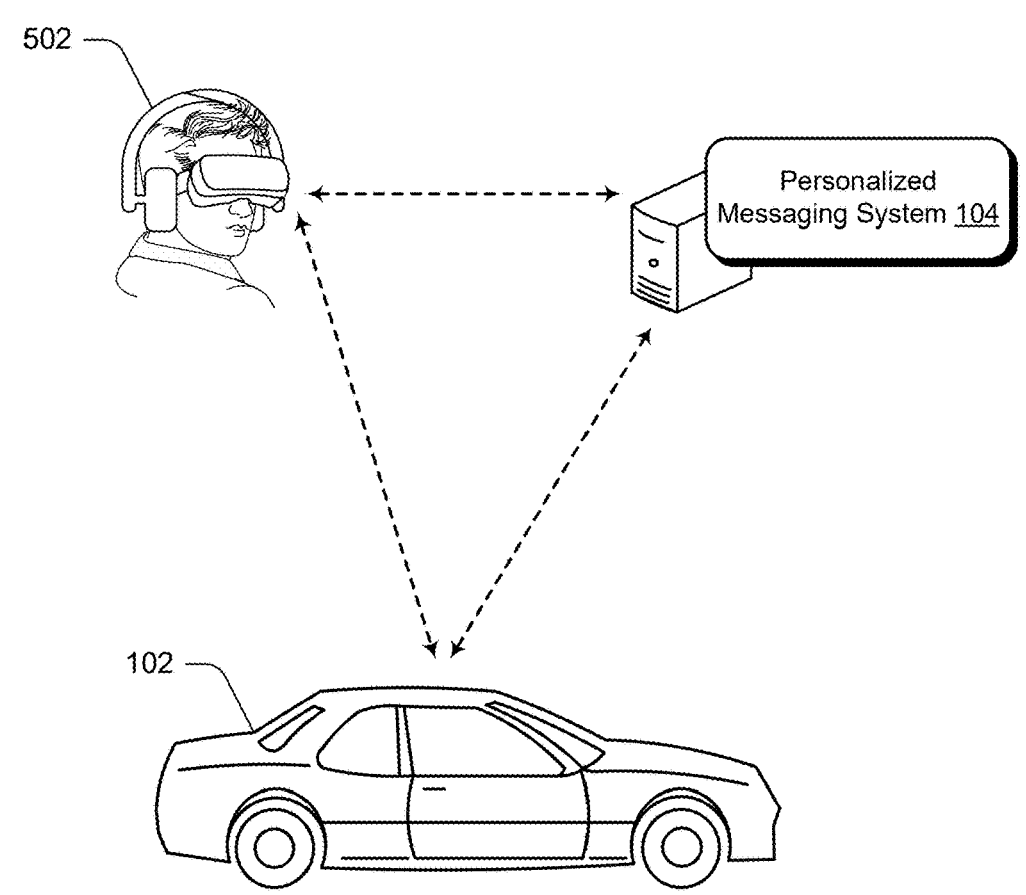
FIG. 5 depicts an example of another system for message personalization for an electromechanical device.

FIG. 5 depicts an example 500 of another system for message personalization for an electromechanical device.

The illustrated example 500 includes an electromechanical device 102 and a personalized messaging system 104 in communication via one or more networks, which may be examples of the corresponding features as described with reference to FIG. 1. The electromechanical device 102 and the personalized messaging system 104 may further be in communication with a user device, such as an extended reality device 502. Although the extended reality device 502 is illustrated in the example 500, the electromechanical device 102 and the personalized messaging system 104 may additionally, or alternatively, be communicatively coupled with any other device (e.g., a mobile device, a computer, a wearable device, etc.).

In some examples, a user may utilize an extended reality device 502 to engage in extended reality experiences. Extended reality experiences include augmented reality experiences in which digital information is overlayed onto existing real-world surroundings and virtual reality experiences including immersive digital environments. Example extended reality devices 502 include, but are not limited to, headsets, headphones, glasses, haptic components, and holographic projectors.

An extended reality device 502 can be wirelessly connected to the electromechanical device 102 and/or the personalized messaging system 104 via the networks (e.g., networks 108 as described with reference to FIG. 1). For example, the extended reality device 502, the electromechanical device 102, and the personalized messaging system 104 can exchange signaling (e.g., data and control signaling) via the networks. By exchanging signaling, the electromechanical device 102 and the personalized messaging system 104 can determine when the extended reality device 502 is being used. That is, the extended reality device 502 can establish a wireless connection with the electromechanical device 102 and/or the personalized messaging system 104 as part of an initialization procedure and can disconnect from the electromechanical device 102 and/or the personalized messaging system 104 as part of a power down procedure or when entering a standby mode.

Figure 6:
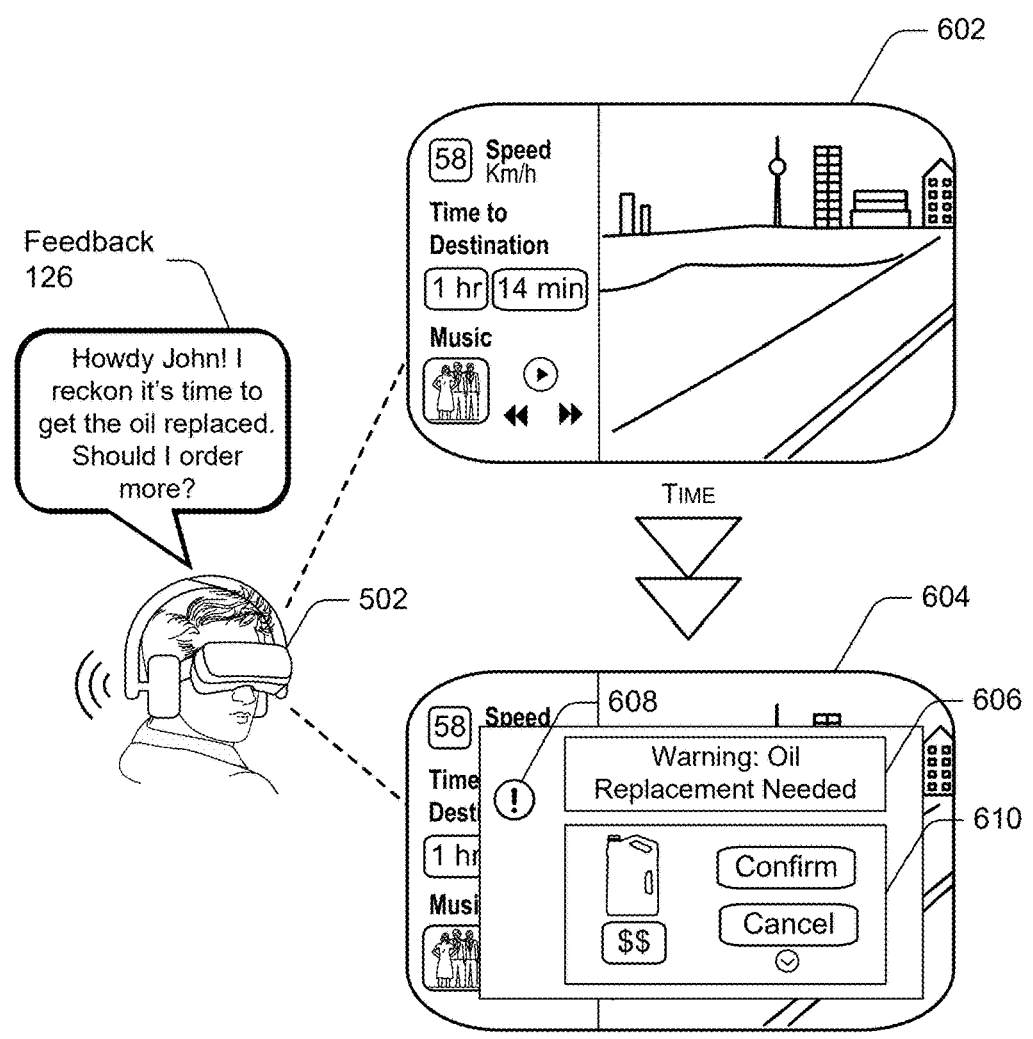
FIG. 6 depicts an example of a user interface for message personalization for an electromechanical device.

In some examples, the personalized messaging system 104 can send a message indicating feedback (e.g., the feedback 126 as described with reference to FIGS. 1 through 4) to the extended reality device 502 for presentation to a user, which is described in further detail with respect to FIG. 6.

FIG. 6 depicts an example 600 of a user interface for message personalization for an electromechanical device.

The illustrated example 600 includes displays via a user interface of an extended reality device 502, which is an example of the corresponding device as described with reference to FIG. 5. At a first time, the extended reality device 502 generates the display 602. A user can configure the display 602 by selection configurable options via the user interface of the extended reality device 502. At a second time, there may be a change in an operating state of a component, such as a change from a normal oil level operating state of a component to a low oil operating state of a component.

The extended reality device 502 may be in communication with an electromechanical device and/or a personalized messaging system that generates a message with feedback 126 in response to the change in operating state of the component (e.g., the feedback 126 as described with reference to FIGS. 1 through 5). The extended reality device 502 may receive a message indicating feedback 126 from the electromechanical device and/or the personalized messaging system. In some examples, the extended reality device 502 generates the display 604 in response to receiving the message indicating the feedback 126. The display 604 includes an alert message 606 (e.g., "Warning: Oil Replacement Needed") and an alert icon 608. Additionally, or alternatively, the extended reality device 502 generates audio output via one or more audio output components (e.g., speakers) that indicates the feedback 126 (e.g., "Howdy John! I reckon it's time to get the oil replaced. Should I order more?").

In response, a user can provide input asking for the extended reality device 502 to place an order for a replacement component. In some examples, the extended reality device 502 receives an indication of a listing for sale of a replacement component (e.g., from a personalized messaging system 104 as described with reference to FIGS. 1 through 3), such as additional oil if an oil level is detected as low. The extended reality device 502 generates a display 610 of the listing for sale of the replacement component and/or automatically orders the component and notifies the user of the order. In some examples, the user can select a "Confirm" option to initiate purchase of the component. In some other examples, the user can select a "Cancel" option to cancel a purchase of the component. The user can ask for additional information regarding the component and/or compatibility of the component, and the personalized messaging system can generate a response message including the additional information (e.g., using generative artificial intelligence as described with reference to FIGS. 1 through 3).

Although the extended reality device 502 is illustrated as displaying the listing for sale of a replacement component, the extended reality device 502 may additionally, or alternatively, display a listing for sale of one or more tools that are useful for replacement of the component. Alterative, or additional, devices can display the listing for sale of a component and/or tools for replacing the component. For example, a device of a user of the electromechanical device can display the listing for sale of the component, a system of the electromechanical device can display the listing for sale of the component, or the like. In some examples, the extended reality device 502, a device of a user of the electromechanical device, and/or a system of the electromechanical device may automatically place an order for a component and/or tools for replacement or maintenance of the component (e.g., without user input). In some other examples, the extended reality device 502, a device of a user of the electromechanical device, and/or a system of the electromechanical device may prompt a user to confirm and/or cancel an order for a component and/or tools for replacement or maintenance of the component prior to placing the order, as illustrated in FIG. 6. A user may indicate a preference for an extended reality device 502, a device of a user of the electromechanical device, and/or a system of the electromechanical device to automatically place an order for a component and/or tools. Similarly, a user may indicate a preference for an extended reality device 502, a device of a user of the electromechanical device, and/or a system of the electromechanical device to prompt the user prior to placing an order for a component and/or tools.

Figure 7:
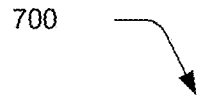
FIG. 7 depicts an example of another system for message personalization for an electromechanical device.

FIG. 7 depicts an example 700 of another system for message personalization for an electromechanical device.

The illustrated example 700 includes an electromechanical device 102 and a personalized messaging system 104 in communication via one or more networks 108, which may be examples of the corresponding features as described with reference to FIG. 1. Although the electromechanical device 102 is illustrated a as a vehicle (e.g., a car), the electromechanical device 102 may be any type of electromechanical device 102 or numerical quantity of electromechanical devices 102. In some examples, the electromechanical device 102 displays a system view 702 for monitoring one or more components of the electromechanical device 102 and/or tracking a speed of the electromechanical device 102. For example, if the electromechanical device 102 is a vehicle, a system view 702 of the vehicle displays a state of a fuel tank as a dial indicator 704, a tachometer 706 for indicating RPM of the engine of the vehicle, a speedometer 708 for indicating the speed of the vehicle, and an oil temperature indicator 710. In one or more implementations, the system view 702 may include additional, or alternative, elements to the elements displayed in the system view 702 illustrated in the example 700.

In some examples, a state of a component of the electromechanical device 102 can change. For example, a state of the electromechanical device 102 can change from an unoccupied state to an occupied state based on a door handle being opened, a weight in a seat changing, a camera and/or audio sensor collecting sensor data indicating the occupied state, or the like. Sensor data can indicate the change in state of a component of the electromechanical device 102.

The electromechanical device 102 and/or the personalized messaging system 104 can determine an identity of the user 712 from analyzing sensor data (e.g., comparing images using image processing techniques, processing audio input to perform voice recognition, an analysis of the force applied to the seat to determine a weight of the user 712, etc.). Additionally, or alternatively, the user 712 provides an audio prompt 714 via a microphone of the electromechanical device 102, and the system of the electromechanical device 102 and/or the personalized messaging system 104 perform voice recognition on the audio prompt 714 to detect the identity of the user 712. In some examples, the system of the electromechanical device 102 maintains a list of users 712 of the electromechanical device 102. The list can be initialized by a user 712 of the electromechanical device 102 (e.g., an owner of the electromechanical device 102) and/or determined by the electromechanical device 102.

The personalized messaging system 104 and/or a system of the electromechanical device 102 can utilize the identity of the user 712 to generate an indication of a modification to one or more system settings and a message indicating that the system settings are updated. The personalized messaging system 104 and/or the electromechanical device 102 update the system settings according to the modification and output the message to the user 712 indicating the system settings are updated. For example, the message can include "Good day John. I've updated the system settings for you."

In some cases, the electromechanical device 102 and/or the personalized messaging system 104 access a database to obtain a set of preferred system settings, such as a seat position, mirror position, temperature control settings, display configuration settings for the system view 702, among other system settings if the electromechanical device 102 is a vehicle. In some examples, the electromechanical device 102 and/or the personalized messaging system 104 store the preferred system settings for new users at the database upon a first occurrence of use of the electromechanical device 102 by the new user.

In some examples, the audio prompt 714 includes a request for the electromechanical device 102 to perform an action. The audio prompt 714 can include instructions to transport a user 712 to a destination, such as "Car, please take me to destination A." A system of the electromechanical device 102 and/or the personalized messaging system 104 can convert the audio prompt 714 to a text prompt (e.g., a text prompt 306) as described with reference to FIG. 3. The audio prompt 416 can trigger generation of a personalized message. For example, the system of the electromechanical device 102 can send the audio prompt 714 and/or the text prompt to a personalized messaging system 104 to generate a message including feedback 126, which may be an example of feedback 126 as described with reference to FIGS. 1 through 6. For example, in response to the audio prompt 714, the message includes the text "Good day sir. I'll get us on our way now. By the way, I've updated the system settings for you."

The personalized messaging system 104 sends the message to the electromechanical device 102 and/or to another device for presentation to the user 712. For example, the personalized messaging system 104 sends the message to an extended reality device of the user 712 if the user 712 is using the extended reality device at the time the personalized messaging system 104 sends the message, as described with respect to FIGS. 5 and 6.

In some examples, if the personalized messaging system 104 sends the message to the electromechanical device 102, the system of the electromechanical device 102 presents the message to the user 712. An audio output component 716 of the electromechanical device 102 (e.g., a speaker) can provide an audio output of the message to the user 712. Additionally, or alternatively, a GUI of the electromechanical device 102 can display the message to the user 712. The message can include language characteristics unique to the electromechanical device 102, as well as a recommendation in response to the audio prompt 714 and/or system information data.

The user 712 may provide additional audio prompts 714, and the electromechanical device 102 can continue to utilize the personalized messaging system 104 to generate personalized messages in response to the additional audio prompts 714.

Example Procedures

This section describes examples of procedures for message personalization for an electromechanical device. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 8 depicts a procedure 800 in an example implementation of message personalization for an electromechanical device.

At 802, system information data associated with a change in state of one or more components of an electromechanical device is received. By way of example, the sensors 132 and/or the diagnostics manager 134 collect the system information data 130. The communications manager 136 of the electromechanical device system 110 sends the system information data 130 to the personalized messaging system 104 to use for personalized message generation. In accordance with the described techniques, the system information data 130 includes one or more of a diagnostic code (e.g., from an onboard diagnostics tool) or sensor data from sensors monitoring components of the electromechanical device. The system information data 130 corresponds to, or indicates, the change in state of the one or more components of the electromechanical device.

At 804, the system information data is input as a prompt to generative artificial intelligence to generate a message indicating feedback responsive to the change in state of the one or more components. The generative artificial intelligence is representative of one or more characteristics of the electromechanical device and is trained to analyze the system information data 130 to generate the feedback. By way of example, a generative artificial intelligence manager 106 designs a personalized messaging model 204 by updating (e.g., training, or fine-tuning) one or more large language models 114 using electromechanical device characteristics 120 and electromechanical device data 118. The generative artificial intelligence manager 106 inputs a prompt 128 including the system information data 130 to the personalized messaging model 204 to generate a message including the feedback 126.

In some cases, a request for the one or more characteristics is transmitted for display at a user interface. The personalized messaging system 104 can send the request to the electromechanical device system 110 and/or to a system of a device of a user of an electromechanical device. The electromechanical device can display the request and/or the device of the user can display the request. In response to the request, user input is received (e.g., by the I/O manager 122 of the electromechanical device system 110 and/or by an I/O manager of a device via interactable elements of the user interface). The electromechanical device system 110 and/or the device of the user can send the user input to the personalized messaging system 104. Additionally, or alternatively, the personalized messaging system 104 can be integrated with the electromechanical device system 110 and/or a system of a device of a user, such that the user input is received directly by the personalized messaging system 104.

In one or more implementations, the one or more characteristics are determined using object recognition techniques (e.g., machine learning techniques, feature extraction, pattern recognition, or any combination thereof) to analyze an image input of the electromechanical device. For example, a personalized messaging system 104, an electromechanical device system 110, and/or a system of a device of a user can receive image input from a camera, the image input illustrating one or more components of the electromechanical device. The personalized messaging system 104, the electromechanical device system 110, and/or the system of the device can analyze the image input using the object recognition techniques to detect the characteristics of the electromechanical device. In some examples, the electromechanical device system 110 and/or the device can send the detected characteristics to the personalized messaging system 104 if the personalized messaging system 104 does not perform the analysis.

In some examples, the image input indicates an identifier of the electromechanical device, such as a VIN or a license plate value if the electromechanical device is a vehicle. The personalized messaging system 104 can access a database to obtain the characteristics. The database stores associations between the identifier of the electromechanical device and the one or more characteristics of the electromechanical device.

In some cases, purchase history data associated with at least one component of the electromechanical device is obtained, such as from transaction records of an account of a user of the electromechanical device. The personalized messaging system 104 can determine the characteristics of the electromechanical device by analyzing the purchase history data. For example, the purchase data can indicate that a user ordered upgraded components for the electromechanical device. The personalized messaging system 104 can update the personalized messaging model using the characteristics of the updated components (e.g., a color, value, make, model, etc. of the updated components).

In some examples, an indication of a modification to one or more system settings of the electromechanical device is received as output from the generative artificial intelligence. The system settings can include one or more of position settings for a user in the electromechanical device, climate setting preferences for the user of the electromechanical device, display configuration settings for the user of the electromechanical device, among other system settings. The generative artificial intelligence can indicate the modified system settings if the system information data indicates that an occupancy state of the electromechanical device has changed, such as a force applied to a seat changing, a door handle opening, camera image data and processing indicating presence of a user, audio data indicating presence of a user, or the like. The generative artificial intelligence can utilize processing techniques, such as image recognition techniques and/or voice recognition techniques, among others, to process the system information data to determine an identity of the user.

In some examples, the personalized messaging system 104 maintains a list of users of the electromechanical device. The personalized messaging system 104 can utilize the processing techniques to compare the system information data to data for each user on the list to determine an identity of the user. The personalized messaging system 104 can store a set of system setting preferences for each user on the list, such that upon detection of a user identity and a change in occupancy state, the personalized messaging system 104 generates the indication of the system settings of the electromechanical device for an identified user. The electromechanical device system 110 and/or the personalized messaging system 104 can update the system settings based on the modification to the one or more system settings.

In some cases, training data is obtained including the characteristics of the electromechanical device and instructions corresponding to operation of the electromechanical device. By way of example, the personalized messaging system 104 can access a database storing operating manuals, repair instruction manuals, maintenance manuals, among other instructions for maintenance and repair of the electromechanical device. The instructions corresponding to operation of the electromechanical device include the information stored at the database. One or more large language models are updated (e.g., by the generative artificial intelligence manager 106 of the personalized messaging system 104) using the training data, the generative artificial intelligence including the one or more large language models. The large language models can be updated in real time as the data in the database is updated and/or as the characteristics of the electromechanical device change.

In one or more implementations, the characteristics of the electromechanical device include at least one of a date of manufacture of the electromechanical device, a geographic location of manufacture of the electromechanical device, a type of the electromechanical device, purchase history of components of the electromechanical device, or one or more physical characteristics of the electromechanical device. The one or more components of the electromechanical device include at least one of hardware components or software components.

At 806, the message is output. By way of example, the personalized messaging system 104 outputs the message to the electromechanical device system 110 and/or to a device of the user. One or more language characteristics of the message are associated with the one or more characteristics of the electromechanical device. For example, if the electromechanical device is manufactured in a geographic location, the electromechanical device may have an accent from that geographic location. If the electromechanical device is old (e.g., an older manufacture date), expensive, used more, painted a bright color, etc. relative to another electromechanical device, then the language characteristics of the electromechanical device can be different than the other electromechanical device.

In some examples, user input is received indicating a preference for the one or more language characteristics. For example, a user may provide user input via a user interface of the electromechanical device and/or another device that indicates language preferences, such as accent preferences, gender preferences, a level of formality, among other language characteristics.

In some examples, outputting the message includes outputting displaying a text representation of the message at a user interface (e.g., a user interface of the electromechanical device or of another device of the user). Additionally, or alternatively, outputting the message includes outputting an audio representation of the message by an audio component (e.g., an audio component of the electromechanical device or of another device of the user). In one or more implementations, the message includes instructions to perform a maintenance procedure in response to the change in the one or more components of the electromechanical device. Additionally, or alternatively, the message includes instructions to purchase at least one replacement component in response to the change in the one or more components of the electromechanical device. For example, a user interface can display a listing for sale of the replacement component. In some examples, the message indicates one or more system settings of the electromechanical device are updated.

Having described examples of procedures in accordance with one or more implementations, consider now an example of a system and device that can be utilized to implement the various techniques described herein.

Example System and Device

Figure 9:
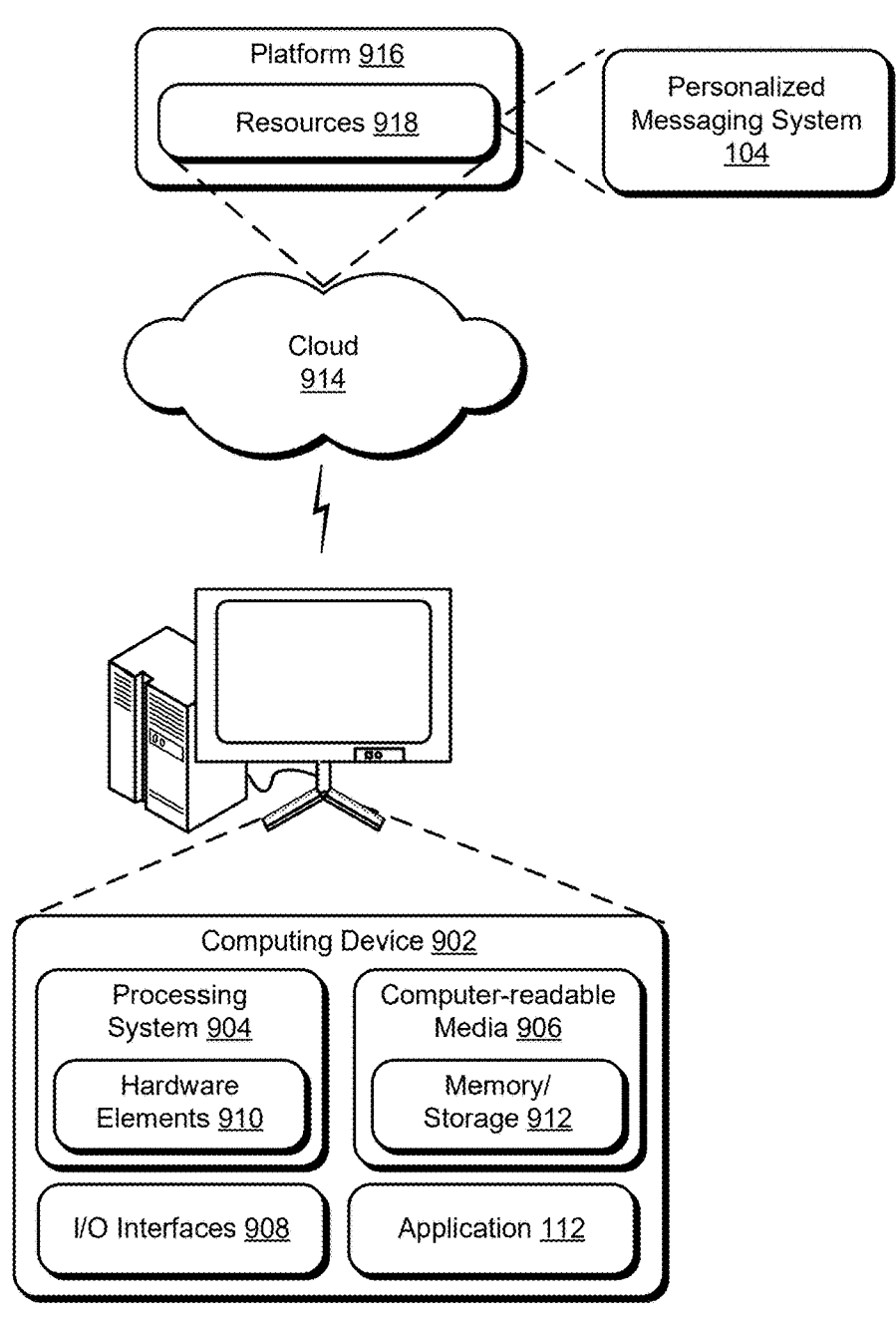
FIG. 9 illustrates an example of a system that includes an example computing device that is representative of one or more computing systems and/or devices that may implement the various techniques described herein.

FIG. 9 illustrates an example of a system generally at 900 that includes an example of a computing device 902 that is representative of one or more computing systems and/or devices that may implement the various techniques described herein. This is illustrated through inclusion of the electromechanical device system 110 and the personalized messaging system 104. The computing device 902 may be, for example, a server of a service provider, a device associated with a client (e.g., a client device), an on-chip system (e.g., of an electromechanical device 102), and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 906 is illustrated as including memory/storage 912. The memory/storage 912 represents memory/storage capacity associated with one or more computer-readable media. The memory/storage 912 may include volatile media (such as random-access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

I/O interface(s) 908 are representative of functionality to allow a user to enter commands and information to computing device 902, and also allow information to be presented to the user and/or other components or devices using various I/O devices. Examples of input devices include a keyboard, a cursor control device (e.g., a mouse), a microphone, a scanner, touch functionality (e.g., capacitive, or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computer-implemented method, comprising:
receiving system information data associated with a change in state of one or more components of an electromechanical device;
generating a message indicating feedback responsive to the change in state of the one or more components, the generating performed by inputting the system information data as a prompt to generative artificial intelligence representative of a plurality of characteristics of the electromechanical device, the generative artificial intelligence trained to analyze the system information data and to output the message that has one or more language characteristics based on the plurality of characteristics of the electromechanical device, wherein the one or more language characteristics are unique to the electromechanical device; and
outputting the message indicating the feedback.

2. The computer-implemented method of claim 1, further comprising:
transmitting, for display at a user interface, a request for the plurality of characteristics; and
in response to the request, receiving user input indicating the plurality of characteristics.

3. The computer-implemented method of claim 1, further comprising determining the plurality of characteristics based on using object recognition techniques to analyze an image input associated with the electromechanical device.

4. The computer-implemented method of claim 3, wherein the image input indicates an identifier of the electromechanical device, the computer-implemented method further comprising accessing a database to obtain the plurality of characteristics, the database storing associations between the identifier of the electromechanical device and the plurality of characteristics of the electromechanical device.

5. The computer-implemented method of claim 1, further comprising:

obtaining purchase history data associated with at least one component of the electromechanical device; and determining the plurality of characteristics based on the purchase history data.

6. The computer-implemented method of claim 1, wherein outputting the message comprises displaying, at a user interface, a text representation of the message.

7. The computer-implemented method of claim 1, wherein outputting the message comprises outputting, by an audio component, an audio representation of the message.

8. The computer-implemented method of claim 1, wherein the system information data includes a diagnostic code corresponding to the change in state of the one or more components of the electromechanical device.

9. The computer-implemented method of claim 1, wherein the system information data includes sensor data corresponding to the change in state of the one or more components of the electromechanical device.

10. The computer-implemented method of claim 1, wherein the message includes instructions to perform a maintenance procedure in response to the change in the one or more components of the electromechanical device.

11. The computer-implemented method of claim 1, wherein the message includes instructions to purchase at least one replacement component in response to the change in the one or more components of the electromechanical device.

12. The computer-implemented method of claim 1, further comprising:

receiving, as output from the generative artificial intelligence, an indication of a modification to one or more system settings of the electromechanical device based on the change in the one or more components of the electromechanical device; and updating the one or more system settings based on the modification to the one or more system settings, wherein the message indicates the one or more system settings are updated.

13. The computer-implemented method of claim 1, further comprising:

obtaining training data including the plurality of characteristics of the electromechanical device and instructions corresponding to operation of the electromechanical device; and updating one or more large language models using the training data, the generative artificial intelligence including the one or more large language models.

14. The computer-implemented method of claim 1, wherein the plurality of characteristics of the electromechanical device include at least one of a date of manufacture of the electromechanical device, a geographic location associated with the electromechanical device, a type of the electromechanical device, purchase history of components of the electromechanical device, or one or more physical characteristics of the electromechanical device, and wherein the one or more language characteristics are unique to the electromechanical device based on the generative artificial intelligence including a personalized messaging model trained to output the message that reflects the plurality of characteristics of the electromechanical device.

15. The computer-implemented method of claim 1, wherein the one or more components of the electromechanical device include at least one of hardware components or software components.

16. The computer-implemented method of claim 1, wherein the electromechanical device is a vehicle.

17. A system, comprising:

one or more processors; and a computer-readable storage medium storing instructions that are executable by the one or more processors to perform operations comprising:

receiving system information data associated with a change in state of one or more components of an electromechanical device;

generating a message indicating feedback responsive to the change in state of the one or more components, the generating performed by inputting the system information data as a prompt to generative artificial intelligence representative of a plurality of characteristics of the electromechanical device, the generative artificial intelligence trained to analyze the system information data and to output the message that has one or more language characteristics based on the plurality of characteristics of the electromechanical device, wherein the one or more language characteristics are unique to the electromechanical device; and outputting the message indicating the feedback.

18. The system of claim 17, wherein the operations further comprise:

transmitting, for display at a user interface, a request for the plurality of characteristics; and in response to the request, receiving user input indicating the plurality of characteristics.

19. The system of claim 17, wherein the operations further comprise determining the plurality of characteristics based on using object recognition techniques to analyze an image input associated with the electromechanical device.

20. One or more computer-readable storage media comprising computer-executable instructions stored thereon that, responsive to execution by one or more processors, perform operations comprising:

obtaining training data including a plurality of characteristics of an electromechanical device and instructions corresponding to operation of the electromechanical device;

updating one or more large language models using the training data, the updated one or more large language models representative of the plurality of characteristics of the electromechanical device, the one or more large language models trained to analyze system information data associated with a change in state of one or more components of the electromechanical device;

receiving the system information data;

generating, responsive to the change in state of the one or more components, a message indicating that has one or more language characteristics based on the plurality of characteristics of the electromechanical device, the generating performed by inputting the system information data as a prompt to the updated one or more large language models, wherein the one or more language characteristics are unique to the electromechanical device; and outputting the message indicating the feedback.

\* \* \* \* \*